UNITED STATES PATENT OFFICE.

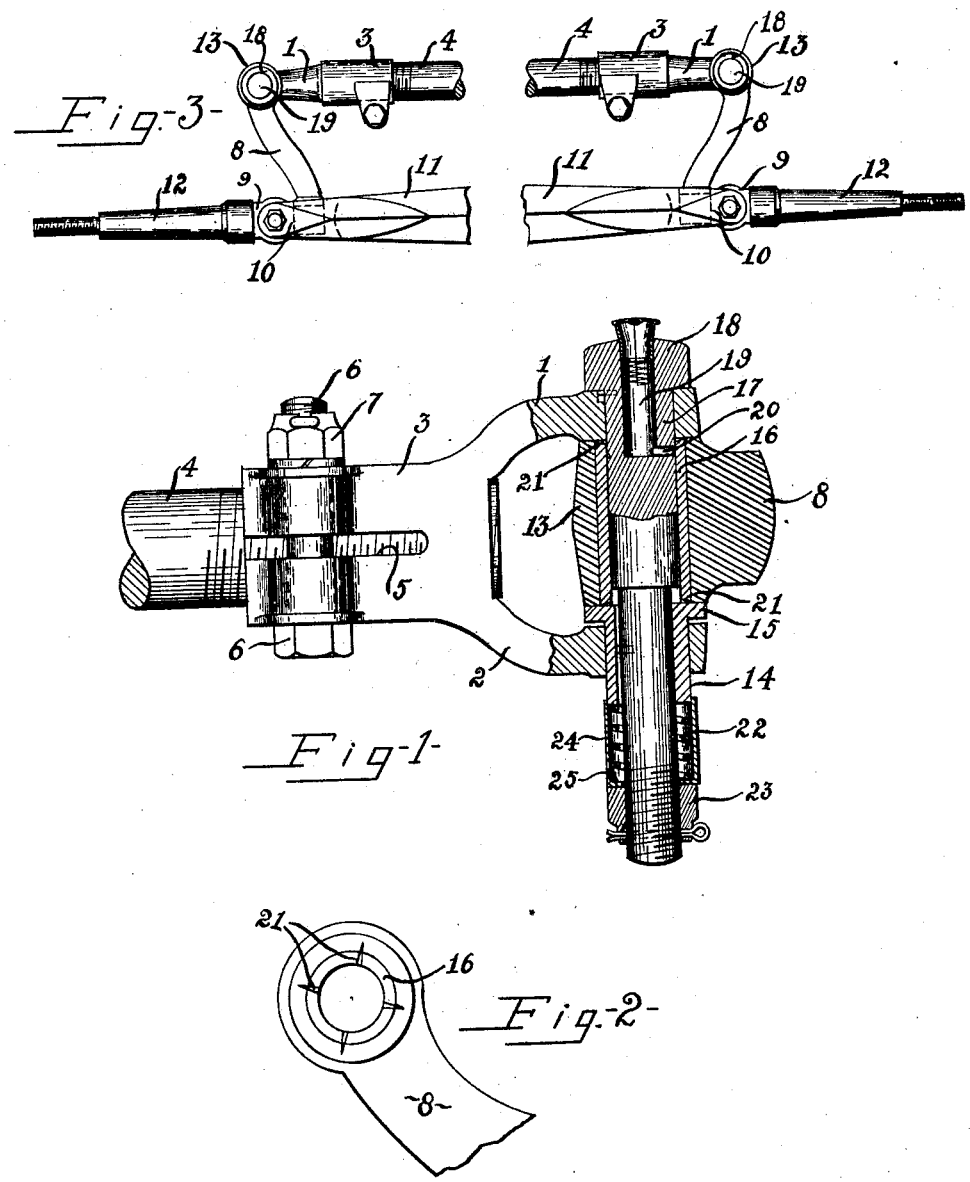

NATHEN A. LOCKE, OF FULTON, NEW YORK.

ANTIRATTLING JOINT FOR STEERING GEARS.

1,408,213.   Specification of Letters Patent.   Patented Feb. 28, 1922.

Application filed February 7, 1920. Serial No. 356,977.

*To all whom it may concern:*

Be it known that I, NATHEN A. LOCKE, of Fulton, in the county of Oswego, in the State of New York, have invented a certain new and useful Antirattling Joint for Steering Gears, of which the following is a specification.

This invention has for its object an antirattling joint, particularly applicable for the cross rod connecting the arms of the steering knuckles of motor vehicles, which is especially simple in construction and highly efficient and durable in use. The invention consists in the novel features and in the combinations and constructions hereinafter set forth and claimed.

In describing this invention, reference is had to the accompanying drawings, in which like characters designate corresponding parts in all the views.

Figure 1 is an enlarged sectional view of a joint embodying my invention.

Figure 3 is a plan view, partly broken away, of a front axle of a motor vehicle, the steering knuckles and the cross rod connected to the knuckles by this joint.

Figure 2 is a fragmentary view of one of the arms of the knuckle showing the hub and bushing therein in end elevation.

This joint comprises generally a member having arms formed with alined bearings, a second member having a hub arranged between said arms, an endwisely movable bushing in the bearing of one of said arms and thrusting against said hub, a pin extending through the bearing of the other of said arms, the hub and the bushing, and means for thrusting the bushing axially of the pin against the end of said hub.

1 and 2 are the arms formed with alined openings or bearings, these arms being the branches of a yoke, the body 3 of which is mounted on the end of the cross rod 4 of a steering gear, said body threading on the cross rod 4 and being split or slotted at 5 to form a split bearing which is tightened on the threaded end of the rod by a bolt and nut 6 and 7.

8 is the second member which is the arm of steering knuckle 9 mounted in a yoke or fork 10 at each end of the front axle 11 of a motor vehicle and carrying the spindle 12 for a front wheel.

The member 8 is formed with a hub 13 located between the arms 1, 2, in alinement with the bearings between said arms. 14 is the axially movable bushing located in the bearing in the lower arm 2 of the yoke and thrusting at its upper end against the lower end of the hub 13, it having an annular flange 15 at its upper end. The bushing 14 or the flange 15 also abuts against a bushing 16 in the hub 13.

17 is the hinge or pivot pin extending through the bearing of the arm 1, the hub 13 or bushing 16 therein and the bushing 14, and projecting beyond the lower side of the arm 2, the pin having a head 18 at its upper end overlying the arm 1. The pin is also provided with an oil cup, as 19, and ducts 20 leading radially through the periphery of the pin. The ends of the bushing 16 are also formed with ducts 21, by which a lubricant is conducted by capillary attraction or otherwise, to the end faces of the hub 13.

The means for thrusting the bushing axially of the pin against the hub 13 to take up looseness comprises a spring 22 encircling the lower projecting end of the pin 17 and interposed between an adjusting nut 23 on the lower end of the pin and the lower end of the bushing 14. This spring is preferably enclosed by a sleeve 24 having an inturned flange 25 overlying the nut 23, this sleeve telescoping with the portion of the bushing 14 projecting below the lower face of the arm 2.

It will be apparent that all looseness between the members 1 and 8 is taken up by the spring 22 and that from time to time the nut 23 can be tightened should any additional looseness develop.

What I claim is:

An anti-rattling joint comprising a member having arms formed with alined bearings, a member having a hub located between said arm and having a cylindrical bore, a bushing located in one of the bearings and slidable axially therein, and thrusting against one end of the hub, a cylindrical pin extending through the other of said bearings, said hub and the bushing and a spring encircling the pin and pressing against the bushing, substantially as and for the purpose described.

In testimony whereof, I have hereunto signed my name, at Fulton, in the county of Oswego, in the State of New York, this 12th day of January, 1920.

NATHEN A. LOCKE.